United States Patent
Watanabe et al.

(10) Patent No.: US 8,823,235 B2
(45) Date of Patent: Sep. 2, 2014

(54) ROTOR FOR AXIAL GAP-TYPE PERMANENT MAGNETIC ROTATING MACHINE

(75) Inventors: Naoki Watanabe, Tokyo (JP); Yuhito Doi, Tokyo (JP); Takehisa Minowa, Tokyo (JP); Hajime Nakamura, Tokyo (JP); Koichi Hirota, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 122 days.

(21) Appl. No.: 12/889,849

(22) Filed: Sep. 24, 2010

(65) Prior Publication Data
US 2011/0080065 A1 Apr. 7, 2011

(30) Foreign Application Priority Data
Oct. 1, 2009 (JP) ................................. 2009-229617

(51) Int. Cl.
*H02K 1/27* (2006.01)
(52) U.S. Cl.
CPC .................................... *H02K 1/2793* (2013.01)
USPC ................................ 310/156.32; 310/156.43
(58) Field of Classification Search
USPC .............. 310/156.32–156.37, 156.07, 156.43
See application file for complete search history.

(56) References Cited

U.S. PATENT DOCUMENTS

| 3,292,023 | A | * | 12/1966 | Kober | 310/156.75 |
|---|---|---|---|---|---|
| 3,304,449 | A | * | 2/1967 | Pohlman et al. | 310/103 |
| 5,034,146 | A | | 7/1991 | Ohashi et al. | |
| 8,030,816 | B2 | * | 10/2011 | Atarashi et al. | 310/156.36 |
| 8,269,391 | B2 | * | 9/2012 | Yamashita et al. | 310/156.45 |
| 2005/0127769 | A1 | * | 6/2005 | Minagawa | 310/156.32 |
| 2006/0071287 | A1 | * | 4/2006 | Yuasa et al. | 257/421 |
| 2007/0017601 | A1 | | 1/2007 | Miyata et al. | |
| 2008/0054738 | A1 | * | 3/2008 | Komuro et al. | 310/46 |
| 2008/0245442 | A1 | | 10/2008 | Nakamura et al. | |
| 2009/0251021 | A1 | * | 10/2009 | Atarashi et al. | 310/156.07 |
| 2010/0090555 | A1 | * | 4/2010 | Tajima et al. | 310/156.35 |

FOREIGN PATENT DOCUMENTS

| JP | 5-021218 A | 1/1993 |
|---|---|---|
| JP | 5-31807 A | 2/1993 |
| JP | 5-31807 B | 5/1993 |
| JP | 2005-348577 A | 12/2005 |

(Continued)

OTHER PUBLICATIONS

Lucas, Brad; "Enhancing Performance of NdFeB Magnets using the Grain Boundary Diffusion Process (GBDP) and their Effective Application", Magnetics Conference 2009, Apr. 15-16 Chicago, IL.

(Continued)

*Primary Examiner* — Dang Le
(74) *Attorney, Agent, or Firm* — Westerman, Hattori, Daniels & Adrian, LLP

(57) ABSTRACT

An axial gap-type permanent magnetic rotating machine comprises a rotor comprising a rotating shaft having an axis of rotation, a rotor yoke of disc shape radially extending from the shaft, and a plurality of permanent magnet segments circumferentially arranged on a surface of the rotor yoke such that each permanent magnet segment may have a magnetization direction parallel to the axis of rotation, and a stator having a plurality of circumferentially arranged coils and disposed to define an axial gap with the rotor. In the rotor, each permanent magnet segment is an assembly of two or more divided permanent magnet pieces, and the coercive force near the surface of the magnet piece is higher than that in the interior of the magnet piece.

12 Claims, 6 Drawing Sheets

(56) References Cited

FOREIGN PATENT DOCUMENTS

| | | |
|---|---|---|
| JP | 2005-354899 A | 12/2005 |
| JP | 2006-261433 A | 9/2006 |
| JP | 2007-53351 A | 3/2007 |
| JP | 2008-061333 A | 3/2008 |
| JP | 2009-200179 A | 9/2009 |
| WO | 2006/043348 A1 | 4/2006 |

OTHER PUBLICATIONS

Machida, Kenichi et al.; "Grain Boundary Modification and Magnetic Properties of Nd-Fe-B Sintered Magnets"; Proceeding of Spring Meeting of Japan Society of Power and Power Metallurgy, 2004, p. 202.

Durst, K. D. et al.: "The Coercive Field of Sintered and Melt-Spun NdFeB Magnets,"; Journal of Magnetism and Magnetic Materials, vol. 68, (1987), pp. 63-75.

Parks, K. T. et al.; "Effect of Metal-Coating and Consecutive Heat Treatment on Coercivity of Thin Nd-Fe-B Sintered Magnets," Proceedings of the Sixteenth International Workshop on Rare-Earth Magnets and Their Applications, Sendai, (2000), p. 257-264.

Aoyama, Yasuaki et al.; "Evaluation of the Alternating Magnetic Loss in Divided Nd-Fe-B Sintered Magnet"; The Papers of Joint Technical Meeting on Static Apparatus and Rotating Machinery, The Institute of Electrical Engineers of Japan, Aug. 25, 2006, p. 41-46.

Japanese Office Action dated Mar. 26, 2013, issued in corresponding Japanese Patent Application No. 2009-229617.

Chinese Office Action dated Dec. 25, 2013, issued in corresponding Chinese Patent Application No. 201010577057.X, with English Translation (15 pages).

\* cited by examiner

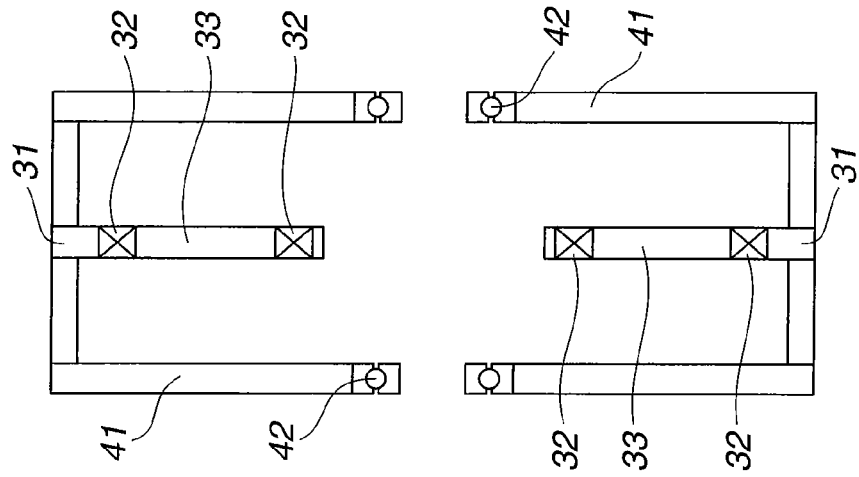
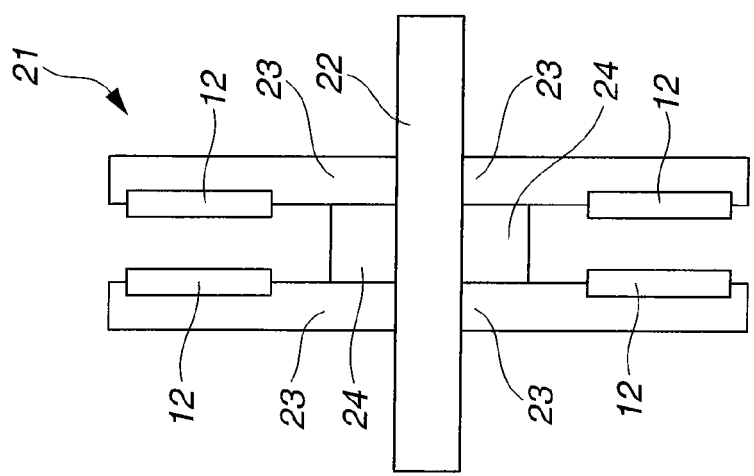
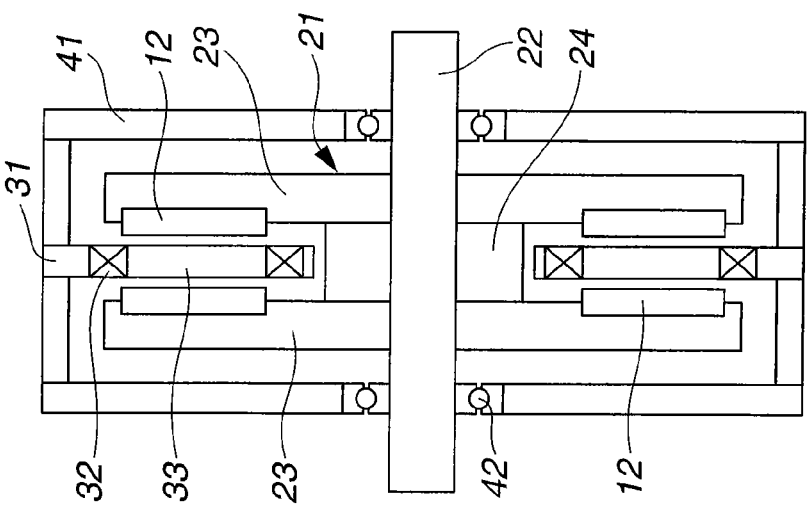

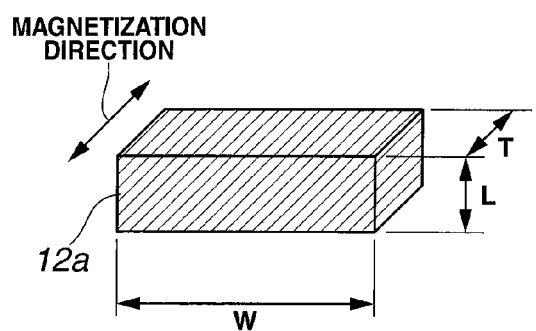
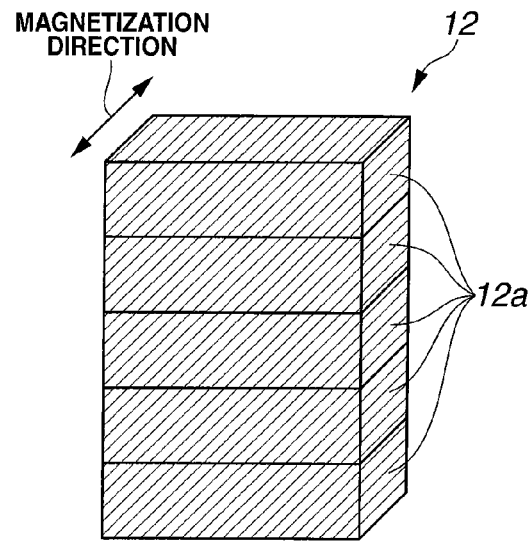

ROTOR FOR AXIAL GAP-TYPE PERMANENT MAGNETIC ROTATING MACHINE

CROSS-REFERENCE TO RELATED APPLICATION

This non-provisional application claims priority under 35 U.S.C. §119(a) on Patent Application No. 2009-229617 filed in Japan on Oct. 1, 2009, the entire contents of which are hereby incorporated by reference.

TECHNICAL FIELD

This invention relates to a synchronous permanent magnetic rotating machine, specifically an axial gap-type permanent magnetic rotating machine comprising a rotor comprising a rotating shaft having an axis of rotation, a rotor yoke of disc shape radially extending from the shaft, and a plurality of permanent magnet segments circumferentially arranged on a surface of the rotor yoke, and a stator having a plurality of circumferentially arranged coils and disposed to define an axial gap with the rotor. More particularly, it relates to the rotor in the permanent magnetic rotating machine, which is best suited as electric vehicle motors, power generators, and factory automation (FA) motors capable of high speed rotation.

BACKGROUND ART

Sintered Nd-base magnets have a growing range of application due to their excellent magnetic properties. Also in the field of rotating machines including motors and power generators, permanent magnetic rotating machines utilizing sintered Nd-base magnets were developed to meet the recent demand for size, profile and weight reductions, performance enhancement and energy saving.

From the structural aspect, the permanent magnetic rotating machines are classified into radial gap and axial gap structures. The radial gap-type rotating machine comprises a rotor comprising a plurality of circumferentially arranged permanent magnets each having radially directed magnetic poles, and a stator opposed to the permanent magnets. In general, the stator includes an iron core having a plurality of teeth on its surface facing the rotor, with coils wound on the teeth. The use of the iron core allows magnetic fluxes from the poles of the rotor to efficiently interlink the coils. This produces an increased torque in the case of motors or a high voltage in the case of power generators. Since coils are wound in the stator, coil ends axially protrude from the magnetic circuit section of the motor whereby the motor is axially prolonged. When a motor having a reduced axial size is necessary, the radial gap-type rotating machine is inconvenient to use, and the axial gap-type rotating machine is rather advantageous.

Permanent magnets in axial gap-type rotating machines are exposed to high temperature due to the heat generated by windings and cores and have a likelihood of demagnetization by the demagnetizing field from the windings. There thus exists a demand for sintered Nd base magnets in which the coercive force which is an index of heat resistance and demagnetization resistance is above a certain level and the remanence (or residual magnetic flux density) which is an index of the magnitude of magnetic force is as high as possible.

Further, sintered Nd base magnets are conductors having an electric resistance of 100 to 200 μΩ-cm. As the rotor rotates, the magnet undergoes a variation of magnetic flux density, by which eddy currents flow. Effective means for reducing eddy currents is to divide a magnet body to interrupt the eddy current path. While division of a magnet body into smaller pieces leads to a more reduction of eddy current loss, it becomes necessary to take into account such problems as an increase of manufacturing cost and a lowering of output due to a reduction of magnet volume by increased interstices.

The eddy current path runs in a plane perpendicular to the magnetization direction of a magnet, with a higher current density prevailing in an outer peripheral portion. The current density is also higher at a side closer to the stator. That is, the amount of heat generated by eddy currents is greater near the magnet surface, so that the magnet surface region assumes a higher temperature and becomes prone to demagnetization. To suppress demagnetization by eddy currents, a sintered Nd base magnet in which the coercive force which is an index of demagnetization resistance is higher in the magnet surface region than in the magnet interior is required.

Several measures are known to improve the coercive force. An increase in the remanence of sintered Nd base magnet is achieved by increases in the volume fraction of $Nd_2Fe_{14}B$ compound and the degree of crystal orientation, and various improvements in process have been made therefor. As to an increase in coercive force, there are known various approaches including formation of crystal grains of finer size, use of an alloy composition having an increased Nd content, and addition of an effective element. Of these, the currently most common approach is the use of an alloy composition having Dy or Tb substituted for part of Nd. By substituting such elements for Nd of $Nd_2Fe_{14}B$ compound, the compound is increased in anisotropic magnetic field as well as coercive force. On the other hand, the substitution of Dy or Tb decreases the saturation magnetic polarization of the compound. Accordingly, the attempt to increase the coercive force by the above approach fails to avoid a lowering of remanence.

In sintered Nd base magnets, the coercive force is given by the magnitude of an external magnetic field created by nuclei of reverse magnetic domains at grain boundaries. Creation of nuclei of reverse magnetic domains is largely dictated by the structure of the grain boundary in such a manner that any disorder of grain structure in proximity to the boundary invites a disturbance of magnetic structure, helping creation of reverse magnetic domains. It is generally believed that a magnetic structure extending from the grain boundary to a depth of about 5 nm contributes to an increase of coercive force (See K. D. Durst and H. Kronmuller, "COERCIVE FIELD OF SINTERED AND MELT-SPUN NdFeB MAGNETS," Journal of Magnetism and Magnetic Materials, 68 (1987), 63-75).

By concentrating trace Dy or Tb only in proximity to the grain boundaries to increase the anisotropic magnetic field only in proximity to the boundaries, the coercive force can be increased while suppressing any decline of remanence (see JP-B 5-31807). Subsequently, the inventors established a production method comprising separately preparing a $Nd_2Fe_{14}B$ compound composition alloy and a Dy or Tb-rich alloy, mixing them and sintering the mixture (see JP-A 5-21218). In this method, the Dy or Tb-rich alloy becomes a liquid phase during the sintering and is distributed so as to surround the $Nd_2Fe_{14}B$ compound. As a consequence, substitution of Dy or Tb for Nd occurs only in proximity to grain boundaries in the compound, so that the coercive force can be effectively increased while suppressing any decline of remanence.

However, since the two types of alloy fine powders in the mixed state are sintered at a temperature as high as 1,000 to 1,100° C., the above-described method has a likelihood that Dy or Tb diffuses not only to the boundaries, but also into the interior of $Nd_2Fe_{14}B$ grains. An observation of the structure of an actually produced magnet shows that Dy or Tb has diffused to a depth of about 1 to 2 μm from the boundary in a grain boundary surface layer, the diffused area reaching 60% or more, calculated as volume fraction. As the distance of diffusion into grains becomes longer, the concentration of Dy or Tb near the boundaries becomes lower. An effective measure for positively suppressing the excessive diffusion into grains is by lowering the sintering temperature. However, this measure cannot be practically acceptable because it compromises densification by sintering. An alternative method of sintering at lower temperatures while applying stresses by means of a hot press or the like enables densification, but poses the problem of extremely reduced productivity.

On the other hand, it is reported that coercive force can be increased by machining a sintered magnet to a small size, depositing Dy or Tb on the magnet surface by sputtering, and heat treating the magnet at a temperature lower than the sintering temperature, thereby causing Dy or Tb to diffuse only to grain boundaries (see K. T. Park, K. Hiraga and M. Sagawa, "Effect of Metal-Coating and Consecutive Heat Treatment on Coercivity of Thin Nd—Fe—B Sintered Magnets," Proceedings of the Sixteen International Workshop on Rare-Earth Magnets and Their Applications, Sendai, p. 257 (2000); and K. Machida, H. Kawasaki, T. Suzuki, M. Ito and T. Horikawa, "Grain Boundary Tailoring of Sintered Nd—Fe—B Magnets and Their Magnetic Properties," Proceedings of the 2004 Spring Meeting of the Powder & Powder Metallurgy Society, p. 202). These methods allow for more effective concentration of Dy or Tb at grain boundaries and succeed in increasing the coercive force without a substantial loss of remanence. As the magnet becomes larger in specific surface area, that is, the magnet body becomes smaller, the amount of Dy or Tb fed becomes larger, indicating that this method is applicable to only compact or thin magnets. However, there is still left the problem of poor productivity associated with the deposition of metal coating by sputtering or the like.

WO 2006/043348 discloses means for efficiently improving coercive force which has solved the foregoing problems and lends itself to mass-scale production. When a sintered $R^1$—Fe—B magnet body, typically sintered Nd base magnet body is heated in the presence of a powder on its surface, the powder comprising one or more of $R^2$ oxides, $R^3$ fluorides, and $R^4$ oxyfluorides wherein each of $R^1$ to $R^4$ is one or more elements selected from among rare earth elements inclusive of Y and Sc, $R^2$, $R^3$ or $R^4$ contained in the powder is absorbed in the magnet body, whereby coercive force is increased while significantly suppressing a decline of remanence. Particularly when $R^3$ fluoride or $R^4$ oxyfluoride is used, $R^3$ or $R^4$ is efficiently absorbed in the magnet body along with fluorine, resulting in a sintered magnet having a high remanence and a high coercive force.

CITATION LIST

Patent Document 1: JP-B H05-31807
Patent Document 2: JP-A H05-21218
Patent Document 3: WO 2006/043348
Non-Patent Document 1: K. D. Durst and H. Kronmuller, "THE COERCIVE FIELD OF SINTERED AND MELT-SPUN NdFeB MAGNETS," Journal of Magnetism and Magnetic Materials, 68 (1987), 63-75
Non-Patent Document 2: K. T. Park, K. Hiraga and M. Sagawa, "Effect of Metal-Coating and Consecutive Heat Treatment on Coercivity of Thin Nd—Fe—B Sintered Magnets," Proceedings of the Sixteen International Workshop on Rare-Earth Magnets and Their Applications, Sendai, p. 257 (2000)
Non-Patent Document 3: K. Machida, H. Kawasaki, T. Suzuki, M. Ito and T. Horikawa, "Grain Boundary Modification and Magnetic Properties of Nd—Fe—B Sintered Magnets," Proceedings of Spring Meeting of Japan Society of Powder and Powder Metallurgy, 2004, p. 202
Non-Patent Document 4: Yasuaki Aoyama and Koji Miyata, "Evaluation of Alternating magnetic Loss in Divided Nd—Fe—B Sintered Magnet," The Papers of Joint Technical Meeting on Static Apparatus and Rotating Machinery, The Institute of Electrical Engineers of Japan, SA-06-83 and RM-06-85, Aug. 25, 2006, p. 41-46

SUMMARY OF INVENTION

An object of the present invention is to provide a rotor for use in an axial gap-type permanent magnetic rotating machine having a high output and heat resistance.

The inventors have found that in an axial gap-type rotating machine using a plurality of permanent magnet segments, better results are obtained when each of the permanent magnet segments is constructed as an assembly of two or more divided permanent magnet pieces (simply referred to as magnet pieces), and the coercive force or heat resistance near the surface of the magnet piece is higher than that in the interior of the magnet piece. In this connection, the inventors presumed that the methods of Machida et al. and WO 2006/043348 are suited for high-output rotating machines because of no loss of remanence, and since the coercive force near the surface of magnet pieces can be increased, the magnet pieces, when used in rotors in axial gap-type rotating machines, are expected to minimize demagnetization due to heat generation by eddy currents. The inventors have found that application of such a method to individual magnet pieces of the permanent magnet assembly is effective in achieving the object of the invention, especially that a sintered Nd base magnet is used and divided into pieces for minimizing the heat generation by eddy currents, that the magnet pieces are used as the magnet for a rotor in an axial gap-type permanent magnetic rotating machine, and that magnet pieces in which the coercive force near their surface is higher than that in their interior, and in which heat resistance near their surface is improved are effective for use in a rotor in an axial gap-type permanent magnetic rotating machine.

More particularly, the inventors have found the following. When a permanent magnetic rotating machine is loaded with magnet pieces into which a magnet has been divided for minimizing the heat generation by eddy current, the magnet pieces show a locally elevated temperature near their surface due to eddy current heat generation. For enhancing the heat resistance of magnet, it is effective to increase the coercive force near the surface of magnet whose temperature becomes elevated. Particularly for enhancing the coercive force near the surface of magnet, it is effective to use a sintered Nd base magnet having a coercive force profile from the surface toward the interior that is created by letting Dy or Tb diffuse from the magnet surface toward the interior. The diffusion of Dy or Tb from the surface toward the interior of magnet takes place mainly via grain boundaries. For example, the method of applying a Dy or Tb oxide powder, Dy or Tb fluoride powder or Dy or Tb-containing alloy powder to the magnet surface and letting Dy or Tb diffuse at a high temperature is effective as the diffusion reaction of Dy or Tb from the surface toward the interior of magnet.

The invention relates to an axial gap-type permanent magnetic rotating machine comprising a rotor comprising a rotating shaft having an axis of rotation, a rotor yoke of disc shape radially extending from the shaft, and a plurality of permanent magnet segments arranged on a surface of the rotor yoke and circumferentially about the axis of rotation such that each permanent magnet segment may have a magnetization direction parallel to the axis of rotation, and a stator having a plurality of coils arranged circumferentially about the axis of rotation, the rotor and the stator being disposed to define an axial gap therebetween.

One embodiment is the rotor wherein each of the permanent magnet segments is an assembly of two or more divided permanent magnet pieces, each of the divided permanent magnet pieces has a coercive force at a surface and an interior, and the coercive force near the surface of the magnet piece is higher than that in the interior of the magnet piece.

Another embodiment is the rotor wherein each of the permanent magnet segments is an assembly of two or more divided permanent magnet pieces, each of the divided permanent magnet pieces has heat resistance at a surface and an interior, and the heat resistance near the surface of the magnet piece is higher than that in the interior of the magnet piece.

In a preferred embodiment, the magnet pieces are of a sintered Nd base rare earth magnet. In a more preferred embodiment, each piece of sintered Nd base rare earth magnet has a coercive force profile from the surface toward the interior, which is created by letting Dy or Tb diffuse from the surface toward the interior of the magnet piece, specifically mainly via grain boundaries. Preferably the step of letting Dy or Tb diffuse from the surface toward the interior of the sintered Nd base rare earth magnet piece includes applying a Dy or Tb oxide powder, a Dy or Tb fluoride powder or a Dy or Tb-containing alloy powder to surfaces of the magnet piece, then holding the magnet piece at a high temperature sufficient to diffuse Dy or Tb.

Advantageous Effects of Invention

The invention is successful in providing a permanent magnetic rotating machine having a high output and heat resistance, the rotor of the machine being loaded with a permanent magnet, typically a sintered Nd base magnet, which has been divided into magnet pieces having a high remanence and a high coercive force, especially at an outer peripheral portion thereof, suited for use in rotors in axial gap-type rotating machines.

BRIEF DESCRIPTION OF DRAWINGS

FIG. 1A is a cross-sectional view of one exemplary axial gap-type motor comprising a rotor and a stator according to the invention, FIG. 1B is a cross-sectional view of the rotor, and FIG. 1C is a cross-sectional view of the stator and a motor case.

FIGS. 2A and 2B are cross-sectional views of exemplary magnet pieces which constitute a permanent magnet assembly in the axial gap-type motor.

FIG. 3 illustrates one exemplary permanent magnet segment for use in the axial gap-type motor according to the invention, FIG. 3A being a perspective view of a magnet piece which has undergone diffusion treatment with Dy or Tb from all surfaces, FIG. 3B being a perspective view of an assembly of such magnet pieces.

DESCRIPTION OF EMBODIMENTS

The invention pertains to an axial gap-type permanent magnetic rotating machine comprising a rotor comprising a rotating shaft having an axis of rotation, a rotor yoke of disc shape radially extending from the shaft, and a plurality of permanent magnet segments arranged on or in a surface of the rotor yoke and circumferentially about the axis of rotation such that each permanent magnet segment may have a magnetization direction parallel to the axis of rotation, and a stator having a plurality of coils arranged circumferentially about the axis of rotation. The rotor and the stator are disposed to define an axial gap therebetween. In the rotor, each permanent magnet segment is an assembly of two or more divided permanent magnet pieces (simply referred to as magnet pieces), each magnet piece has a coercive force or heat resistance at a surface and an interior, and the coercive force or heat resistance near the surface of the magnet piece is higher than the coercive force or heat resistance in the interior of the magnet piece.

Figure 6A:
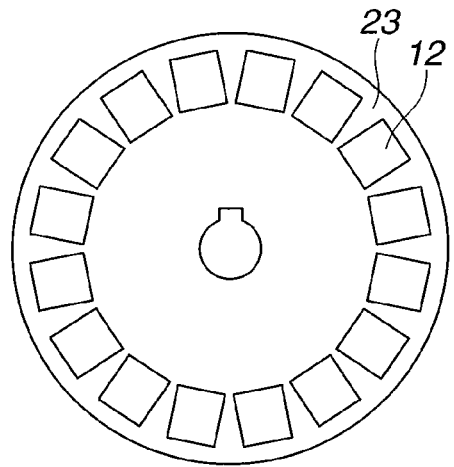
FIGS. 6A, 6B and 6C are elevational views of different examples of the disc shaped rotor yoke of the rotor having permanent magnet segments disposed thereon, FIG. 6A illustrating rectangular segments, FIG. 6B illustrating trapezoidal segments, and FIG. 6C illustrating sector segments.
Figure 6B:
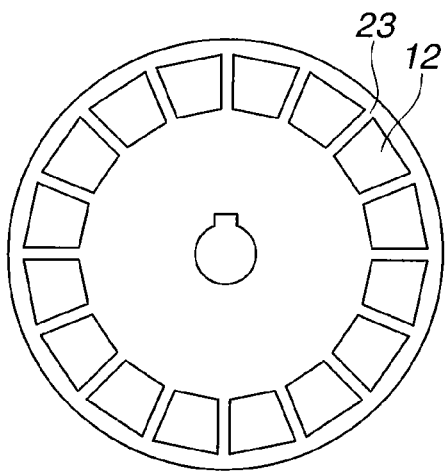
Figure 6C:
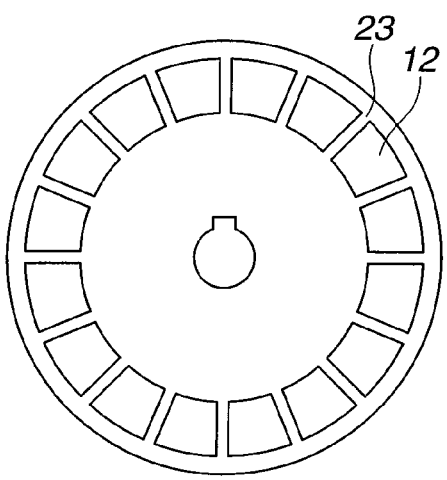

FIG. 1 illustrates an exemplary axial gap-type rotating machine. The machine is illustrated in FIG. 1A as comprising a rotor 21 and a stator 31, which are separately illustrated in FIGS. 1B and 1C, respectively. The rotor 21 includes a rotating shaft 22 having an axis of rotation, and a pair of disc-shaped rotor yokes 23 of magnetic material radially extending from the shaft 22. A plurality of permanent magnet segments 12 are anchored in major surfaces of rotor yokes 23 and arranged circumferentially about the axis of rotation (22) such that each permanent magnet segment may have a magnetization direction parallel to the axis of rotation (22), and the adjacent magnet segments are of opposite polarity. FIG. 6 shows that a plurality of permanent magnet segments of rectangular shape (FIG. 6A), trapezoidal shape (FIG. 6B), or sector shape (FIG. 6C) may be arranged on the major surface of each rotor yoke 23 in a circumferentially spaced apart relationship. The shape of each permanent magnet segment as viewed in an axial direction may be rectangular or square as shown in FIGS. 3 and 6A, trapezoidal as shown in FIG. 6B, or sectorial as shown in FIG. 6C. The number of poles or segments may be selected appropriate for a particular purpose of the rotating machine. The rotor yokes 23 are fitted on the shaft 22 and spaced apart by a spacer 24 so that the major surfaces having permanent magnet segments 12 arranged thereon face each other. Although permanent magnet segments may be disposed on only one rotor yoke surface, the arrangement of permanent magnet segments on both rotor yoke surfaces is preferred for magnetic efficiency.

As used herein, the term "axial" direction refers to the axis of rotation of the rotor.

The stator 31 is disposed between the rotor yokes 23 and 23 to define axial gaps therebetween. The stator 31 includes coils 32 and an annular coil support 33. The coils 32 are circumferentially spaced apart as viewed in an axial direction. The circumference where the coils 32 are arranged is concentric with the circumference where the permanent magnet segments 12 are arranged on the rotor yoke 23. The coils 32 are mounted on the support 33 which is fixedly secured to a case 41. The case 41 is configured to accommodate the rotor 21 and the stator 31 therein. Disposed between the case 41 and the rotating shaft 22 are bearings 42 by which the shaft 22 is supported for rotation. As the permanent magnet segments 12 which are opposed to the coils 32 are rotated together with the rotating shaft 22, alternating magnetic fields may interlink the coils 32.

As shown in FIG. 1, the coils 32 are disposed on the stator 31 separately from the rotating shaft 22. The coil 32 may have a core of magnetic material inserted therein so that the magnetic flux interlinking the coil may be increased to produce an increased output. Alternatively, the coil may be coreless to eliminate any magnetic attractive force relative to the magnets on the rotor to facilitate rotation and to eliminate a core loss to achieve an improvement in efficiency.

With the structure described above, a motor with a reduced axial size is available because the coils do not axially protrude from the magnetic circuit section constituting the motor body, and because the output is obtained by radial enlargement of the motor. Particularly when a sintered Nd—Fe—B base magnet is used, a high-output rotating machine that takes advantage of such a strong permanent magnet can be provided.

According to the invention, the permanent magnet segment 12 is an assembly of a plurality of divided permanent magnet pieces 12a as shown in FIG. 3B, for example.

The magnet pieces 12a are preferably of sintered Nd base rare earth magnet. The sintered Nd base rare earth magnet used herein may be obtained by coarsely pulverizing a mother alloy, finely pulverizing, compacting and sintering in a standard way. As mentioned above, the invention uses a discrete sintered magnet in which a coercive force or heat resistance near the surface thereof is higher than a coercive force or heat resistance in the interior thereof, which can be produced by letting Dy or Tb diffuse from the magnet surface toward the interior, and mainly via grain boundaries. More specifically, use is made of a magnet piece which is obtained by a procedure including depositing Dy or Tb on surfaces of a magnet piece by sputtering and heat treating the magnet piece at a temperature lower than the sintering temperature, thereby letting Dy or Tb diffuse only to grain boundaries, or another procedure including applying a powder of Dy or Tb oxide, fluoride or oxyfluoride to surfaces of a magnet piece and heat treating the magnet piece and powder in vacuum or inert gas at a temperature lower than the sintering temperature. More preferably, the desired magnet piece may be obtained by applying a Dy or Tb oxide powder, Dy or Tb fluoride powder or Dy or Tb-containing alloy powder to surfaces of a magnet piece and then holding the magnet piece at a high temperature for letting Dy or Tb diffuse.

The permanent magnet (magnet piece) for use in the axial gap-type rotating machine is obtained by machining a sintered magnet block into a predetermined shape using a grinding wheel, machining blade, wire saw or the like. The cross-sectional shape of the magnet piece is often a rectangular shape as shown in FIG. 2A from the standpoint of ease of working, although the magnet piece may be of a trapezoidal shape as shown in FIG. 2B for the purpose of improving the performance of the rotating machine. It is noted that in FIG. 2, the arrow indicates a magnetization direction M. The magnet segments each consisting of magnet pieces are disposed in the rotor such that their magnetization direction is parallel to the axis of rotation.

The size of a magnet piece is not particularly limited. For diffusion treatment of a magnet piece with Dy or Tb, the proportion of diffusion of Dy or Tb increases as the specific surface area of a magnet piece becomes larger, i.e., the size of a magnet piece becomes smaller. It is then preferred that in FIG. 3A, the smallest one of dimensions W, L, and T is up to 50 mm, more preferably up to 30 mm, and most preferably up to 20 mm. The lower limit of this dimension is not critical although it is practically at least 0.1 mm.

Figure 7A:
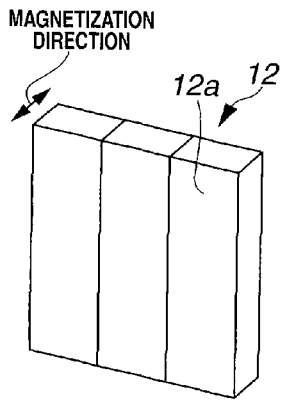
FIGS. 7A to 7I are perspective views of different permanent magnet assemblies.
Figure 7B:
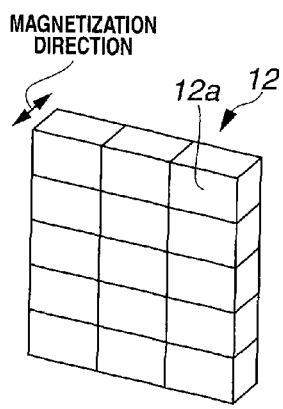
Figure 7C:
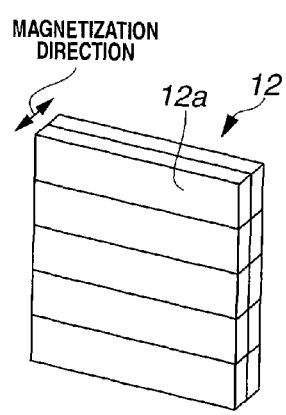
Figure 7D:
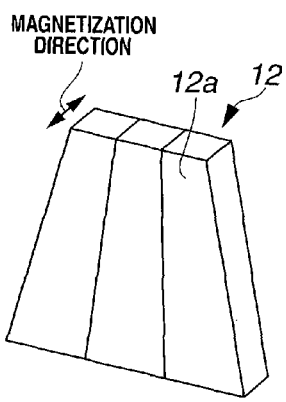
Figure 7E:
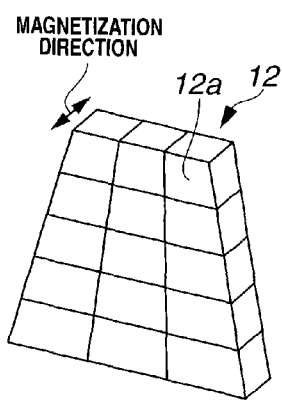
Figure 7F:
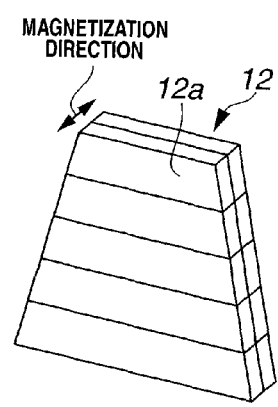
Figure 7G:
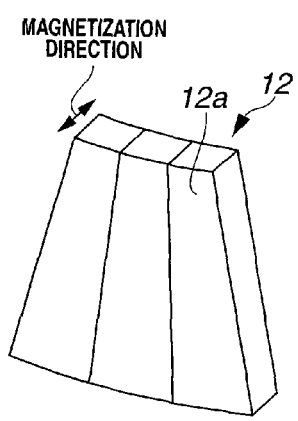
Figure 7H:
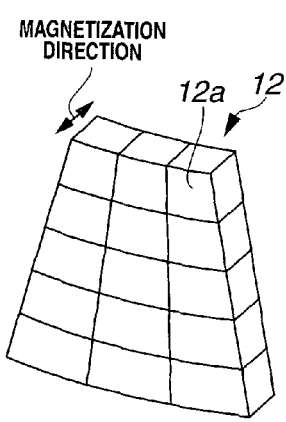
Figure 7I:
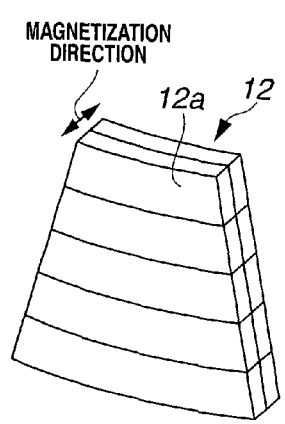

According to the invention, a starting magnet block is machined into permanent magnet pieces having the desired properties. The number of division of a permanent magnet segment is at least 2 pieces, preferably in the range of 2 to 50 pieces, and more preferably 4 to 25 pieces, and if necessary, divided magnet pieces are bonded with an adhesive to form an assembly. The assembly may be any of various embodiments including an assembly constructed by stacking a plurality of magnet pieces 12a of parallelepiped plate shape, with their W direction (longitudinal direction) aligned with a horizontal direction, as shown in FIG. 3B; an assembly constructed by disposing magnet pieces 12a of parallelepiped shape with their longitudinal direction aligned with a vertical direction, juxtaposing a plurality of such magnet pieces in a row, and integrating them, as shown in FIG. 7A; an assembly constructed by stacking a plurality of magnet pieces 12a of cubic shape in a perpendicular direction, juxtaposing such stacks in a row in a transverse direction, and integrating them, as shown in FIG. 7B; and an assembly constructed by juxtaposing two stacks each consisting of magnet pieces 12a of parallelepiped shape stacked as shown in FIG. 3B, and integrating them, as shown in FIG. 7C. Also included are an assembly constructed by joining magnet pieces 12a of frusto-quadrangular-pyramid shape with their longitudinal direction substantially aligned with a vertical direction, juxtaposing a plurality of such magnet pieces in a row, and integrating them, as shown in FIG. 7D; an assembly constructed by stacking a plurality of magnet pieces 12a of frusto-quadrangular-pyramid shape in a perpendicular direction, juxtaposing such stacks in a row in a transverse direction, and integrating them, as shown in FIG. 7E; and an assembly constructed by juxtaposing two stacks each consisting of magnet pieces 12a of frusto-quadrangular-pyramid shape stacked, and integrating them, as shown in FIG. 7F. Also included are an assembly constructed by joining magnet pieces 12a of sector (or fan) block shape with their longitudinal direction substantially aligned with a vertical direction, juxtaposing a plurality of such magnet pieces in a row, and integrating them, as shown in FIG. 7G; an assembly constructed by stacking a plurality of magnet pieces 12a of sector block shape in a perpendicular direction, juxtaposing such stacks in a row in a transverse direction, and integrating them, as shown in FIG. 7H; and an assembly constructed by juxtaposing two stacks each consisting of magnet pieces 12a of sector block shape stacked, and integrating them, as shown in FIG. 7I. The assembly is not limited to the illustrated embodiments.

The assembly of stacked magnet pieces is mounted on the rotor yoke, constructing an axial gap-type rotor.

In the axial gap-type rotating machine, the magnetic flux passing across the permanent magnet varies momentarily with rotation of the rotor, and this variation of magnetic field causes eddy currents to generate within the magnet. Eddy currents flow in a plane perpendicular to the magnetization direction of the magnet.

Even in the magnet piece 12a, eddy currents flow in a plane perpendicular to the magnetization direction. The flow of eddy currents and the temperature distribution within the magnet pieces are summarized in the schematic view of FIG.

Figure 5A:
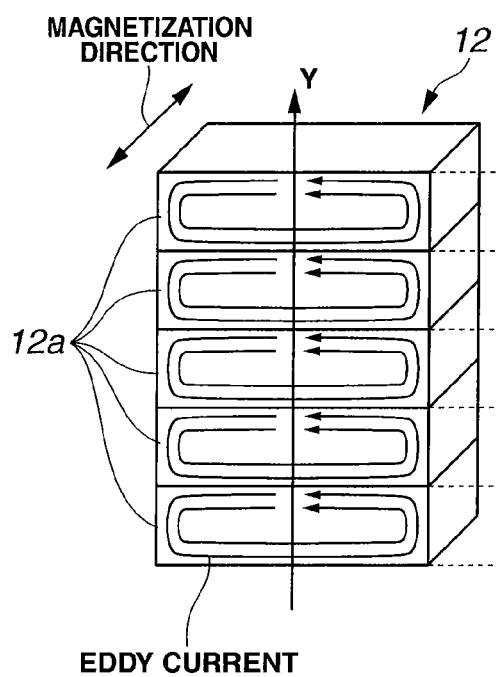
FIG. 5A illustrates how eddy currents flow in the permanent magnet assembly of FIG. 3B in an axial gap-type motor.
Figure 5B:
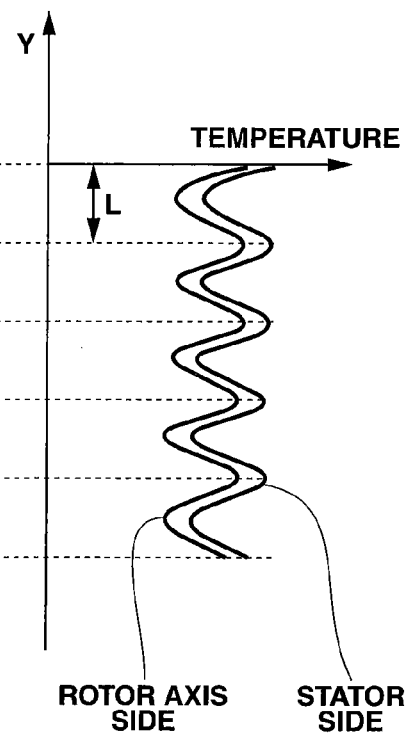
FIG. 5B illustrates the temperature distribution within the magnet pieces in the assembly.

5. As seen from FIG. 5, the density of eddy current becomes higher at an outer peripheral portion of each magnet piece where the temperature rises. Since the magnetic field variation is greater on the stator side, the temperature distribution in the magnetization direction is slightly higher on the stator side than on the rotor axis side. To suppress demagnetization due to eddy currents, an Nd magnet piece is required in which the coercive force (serving as an index of demagnetization resistance) is higher near the surface of the magnet piece corresponding to the magnet outer peripheral portion than in the magnet interior. The magnet interior where less heat is generated by eddy currents does not need a more than necessity coercive force.

FIG. 3 illustrates one embodiment. Dy or Tb is diffused from all surfaces of magnet piece 12a as shown in FIG. 3A (the shaded zones are surfaces from which Dy or Tb is diffused). Five magnet pieces 12a having a thus increased coercive force near the surface thereof are integrated with an adhesive into an assembly as shown in FIG. 3B. Even in the embodiment of FIG. 3, there are available Nd magnet pieces in which the coercive force (serving as an index of demagnetization resistance) is higher near the surface of the magnet piece corresponding to the magnet outer peripheral portion than in the magnet interior. As used herein, the term "near the surface" means a subsurface region which extends about 6 mm (at most) from the surface.

Figure 4A:
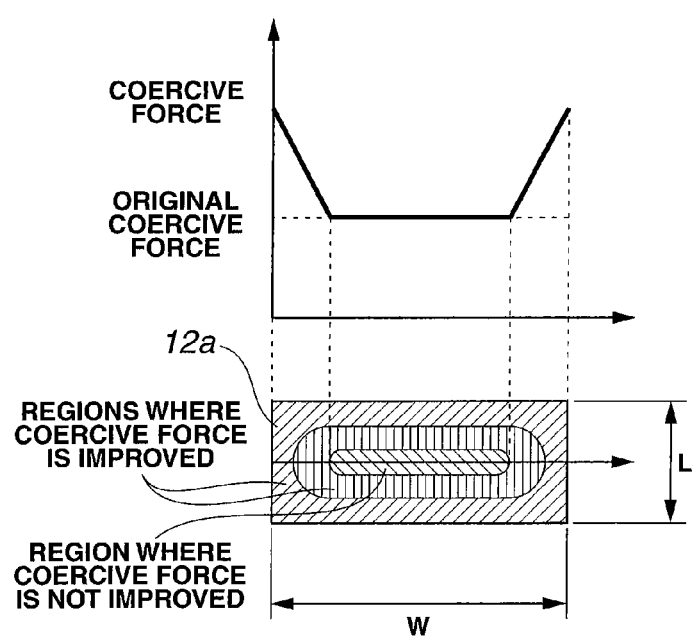
FIG. 4 illustrates the coercive force distribution in the magnet piece of FIG. 3A, FIG. 4A being in side surface, and FIG. 4B being in end surface.
Figure 4B:
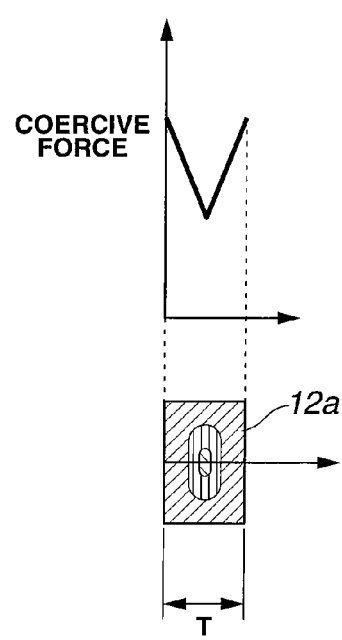

As a result of diffusion/absorption treatment with an element having an extraordinary effect of enhancing magnetocrystalline anisotropy, Dy or Tb from surfaces of a sintered Nd base magnet body, the coercive force of the sintered Nd base magnet is efficiently increased without a substantial loss of remanence. Thus the sintered magnet body has a coercive force distribution. FIG. 4 shows the coercive force distribution of a magnet piece which has undergone diffusion/absorption treatment from all surfaces thereof as shown in FIG. 3. The coercive force near the magnet surface is higher than that in the magnet interior. This embodiment is successful in increasing the coercive force near the magnet surface, providing a coercive force distribution effective for improving heat resistance against the heat generation by eddy currents.

EXAMPLE

Examples are given below for illustrating some embodiments of the present invention, but the scope of the invention is not limited thereby.

Example 1 and Comparative Example 1

A thin plate of alloy was prepared by a so-called strip casting technique, specifically by weighing predetermined amounts of Nd, Co, Al and Fe metals having a purity of at least 99% by weight and ferroboron, high-frequency heating in an argon atmosphere for melting, and casting the alloy melt on a copper single roll in an argon atmosphere. The resulting alloy was composed of 13.5 atom % Nd, 1.0 atom % Co, 0.5 atom % Al, 5.8 atom % B, and the balance of Fe and is designated Alloy A. Alloy A was hydrided and then heated at 500° C. for partial dehydriding while evacuating to vacuum. By this so-called hydriding pulverization, the alloy was pulverized into a coarse powder having a size of up to 30 mesh. Another alloy was prepared by weighing predetermined amounts of Nd, Tb, Fe, Co, Al and Cu metals having a purity of at least 99% by weight and ferroboron, high-frequency heating in an argon atmosphere for melting, and casting. The resulting alloy was composed of 20 atom % Nd, 10 atom % Tb, 24 atom % Fe, 6 atom % B, 1 atom % Al, 2 atom % Cu, and the balance of Co and is designated Alloy B. Using a Brown mill in a nitrogen atmosphere, Alloy B was coarsely pulverized to a size of up to 30 mesh.

Subsequently, Alloy A powder and Alloy B powder were weighed in amounts of 90% and 10% by weight, respectively, and mixed together for 30 minutes on a V blender which had been purged with nitrogen. On a jet mill using high-pressure nitrogen gas, the mixed powder was finely pulverized to an average particle size of 4 µm. The resulting fine powder was compacted in a nitrogen atmosphere under a pressure of about 1 ton/cm$^2$ while being oriented in a magnetic field of 15 kOe. The green compact was then placed in a sintering furnace in an argon atmosphere where it was sintered at 1,060° C. for 2 hours, obtaining a permanent magnet block. Using a diamond grinding wheel, the permanent magnet block was machined on all surfaces into parallelepiped magnet pieces as shown in FIG. 3. These magnet pieces were dimensioned to L=25 mm, W=105 mm and T=20 mm (T in magnetic anisotropy direction). The machined magnet pieces were cleaned with an alkaline solution, pickled and dried. Steps of rinsing with deionized water were included before and after each cleaning step.

Next, dysprosium fluoride having an average particle size of 5 µm was mixed with ethanol at a weight fraction of 50%, in which the parallelepiped magnet pieces were immersed for one minute with ultrasonic waves being applied. The magnet pieces were pulled up and immediately dried with hot air. At this point, the filling factor of dysprosium fluoride in the magnet surface-surrounding space was 45%. The magnet pieces were subjected to absorption treatment in an argon atmosphere at 900° C. for one hour, then to aging treatment at 500° C. for one hour, and quenched, obtaining parallelepiped magnet pieces M1 (Example 1). For comparison purposes, only heat treatment was carried out to produce parallelepiped magnet pieces P1 (Comparative Example 1).

The magnetic properties of these magnet pieces were measured by a vibrating sample magnetometer (VSM). For magnetic property measurement, cubic samples of 1 mm one side were cut out so that the magnetic properties of surface and central regions of a magnet piece were evaluated. Magnet piece M1 showed a remanence Br of 1.415 T at the surface and 1.420 T at the center, and a coercive force Hcj of 1500 kA/m at the surface and 1000 kA/m at the center. Magnet piece P1 showed a Br of 1.420 T and a Hcj of 1000 kA/m both at the surface and the center.

As compared with the coercive force of magnet piece P1 not subjected to dysprosium absorption treatment, permanent magnet piece M1 marked a coercive force increase of 500 kA/m at the outermost periphery. Since the magnet interior was at a distance of 9 mm from the surface, the interior absorbed no dysprosium, with its coercive force kept unchanged. A distribution of coercive force was precisely determined, finding coercive force increases in a subsurface region extending 6 mm from the surface. The permanent magnet piece within the scope of the invention had a decline of remanence which was as small as 5 mT.

By backscattered electron image under SEM and electron probe microanalysis (EPMA) of magnet piece M1, Dy and F were observed in the magnet. Since the magnet prior to the treatment does not contain Dy and F, the presence of Dy and F in magnet piece M1 is attributable to the absorption treatment. Dy absorbed concentrates only near grain boundaries. On the other hand, fluorine (F) is also present in the grain boundary portion and bonds with oxides (contained in the magnet prior to the treatment as incidental impurities) to form oxyfluorides. The distribution of Dy enabled to increase the coercive force while minimizing a decline of remanence.

Next, magnet pieces M1 of Example 1 and magnet pieces P1 of Comparative Example 1 were incorporated in axial gap-type motors, whose performance was evaluated. The permanent magnet motor tested is an axial gap-type motor as shown in FIG. 1. The rotor had a 16-pole structure wherein 16 permanent magnet segments were mounted on disc shaped rotor yokes as shown in FIG. 6A. The rotor yokes had an outer diameter of 850 mm and a thickness of 15 mm. The permanent magnet segments had a width (W) of 105 mm, a dimension (T) of 20 mm in magnetic anisotropy direction, and a dimension (5 L) of 125 mm in a radial direction of the rotor yoke. Each permanent magnet segment consisted of five magnet pieces (M1 or P1) which were stacked in a radial direction of the rotor yoke. The stator had twelve coils.

As shown in FIG. 3, five magnet pieces M1 or P1 were joined with an epoxy adhesive into an assembly, magnetized and incorporated in the rotor yoke. The motors having the magnet pieces M1 and P1 incorporated therein are designated MM1 and MP1, respectively. Before and after the motor was operated at a load torque and a revolution two times the ratings, an induced electromotive force was determined. The induced electromotive force is a voltage developed when a magnetic field of magnet interlinks a coil. The induced electromotive force decreases as the magnet is demagnetized. Under the test conditions, motor MP1 of Comparative Example 1 showed an electromotive force reduction of 28% whereas motor MM1 of Example 1 showed no substantial reduction. It is confirmed that the improved coercive force near the magnet surface is effective for controlling demagnetization by eddy current loss.

While Examples refer to permanent magnet motors, permanent magnet power generators have the same advantages because they are of the same structure.

Japanese Patent Application No. 2009-229617 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An axial gap-type permanent magnetic rotating machine comprising a rotor comprising a rotating shaft having an axis of rotation, a rotor yoke of disc shape radially extending from the shaft, and a plurality of permanent magnet segments arranged on a surface of the rotor yoke and circumferentially about the axis of rotation such that each permanent magnet segment have a magnetization direction parallel to the axis of rotation, and a stator having a plurality of coils arranged circumferentially about the axis of rotation, the rotor and the stator being disposed to define an axial gap therebetween, wherein
   each of said permanent magnet segments is an assembly of two or more divided permanent magnet pieces divided along parallel to a direction of the axis of rotation,
   each of the divided permanent magnet pieces has a magnetization direction parallel to the axis of rotation, and a coercive force at a surface region and
   a central region of the divided permanent magnet piece, and
   in each of the divided permanent magnet pieces, the coercive force in the surface region of the magnet piece is higher than that in the central region of the magnet piece.

2. The axial gap-type permanent magnetic rotating machine of claim 1 wherein the magnet pieces are of a sintered Nd base rare earth magnet.

3. The axial gap-type permanent magnetic rotating machine of claim 2 wherein each piece of sintered Nd base rare earth magnet has a coercive force profile from the surface region toward the central region, which is created by letting Dy or Tb diffuse from the surface toward the interior of the magnet piece.

4. The axial gap-type permanent magnetic rotating machine of claim 3 wherein the step of letting Dy or Tb diffuse from the surface toward the interior of the sintered Nd base rare earth magnet piece includes applying a Dy or Tb oxide powder, a Dy or Tb fluoride powder or a Dy or Tb-containing alloy powder to surfaces of the magnet piece, then holding the magnet piece at a high temperature sufficient to diffuse Dy or Tb.

5. The axial gap-type permanent magnetic rotating machine of claim 2 wherein each piece of sintered Nd base rare earth magnet has a coercive force profile from the surface region toward the central region, which is created by letting Dy or Tb diffuse from the surface toward the interior of the magnet piece mainly via grain boundaries.

6. The axial gap-type permanent magnetic rotating machine of claim 1 wherein
   said each of the divided permanent magnet pieces has heat resistance at a surface region and a central region of the divided permanent magnet piece, and
   in each of the divided permanent magnet pieces, the heat resistance in the surface region of the magnet piece is higher than that in the central region of the magnet piece.

7. The axial gap-type permanent magnetic rotating machine of claim 1 wherein each of said permanent magnet segments is an assembly of 4 to 50 pieces.

8. The axial gap-type permanent magnetic rotating machine of claim 1 wherein the divided permanent magnet pieces are stacked.

9. The axial gap-type permanent magnetic rotating machine of claim 1 wherein each of said permanent magnet segments is an assembly of 2 to 50 pieces, and the divided permanent magnet pieces are bonded with an adhesive to form the assembly.

10. The axial gap-type permanent magnetic rotating machine of claim 1 wherein
    the coils are circumferentially spaced apart as viewed in an axial direction, and
    the circumference where the coils are arranged is concentric with the circumference where the permanent magnet segments are arranged on the rotor yoke.

11. The axial gap-type permanent magnetic rotating machine of claim 1 wherein the coils are disposed on the stator separately from the rotating shaft.

12. The axial gap-type permanent magnetic rotating machine of claim 1 wherein the coercive force in whole of the surface region of the magnet piece is higher than that in the central region of the magnet piece.

* * * * *